United States Patent
Sandgren et al.

(10) Patent No.: US 12,277,573 B1
(45) Date of Patent: Apr. 15, 2025

(54) DIGITAL PROMOTION PROCESSING SYSTEM INCLUDING PROMOTION TERMS PREFERENCE DATA BASED PROMOTION GENERATION AND RELATED METHODS

(71) Applicant: Inmar Clearing, Inc., Winston-Salem, NC (US)

(72) Inventors: Jeffrey Sandgren, Kernersville, NC (US); Forrest Gullion, Melrose, FL (US); Bobbi Iacovelli, Jeannette, PA (US); Richard Polhemus, Winston-Salem, NC (US); Meggan Salmon, Wynnewood, PA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/885,626

(22) Filed: Aug. 11, 2022

(51) Int. Cl.
  *G06Q 30/02* (2023.01)
  *G06Q 30/0207* (2023.01)
  *G06Q 30/0235* (2023.01)

(52) U.S. Cl.
  CPC ..... *G06Q 30/0224* (2013.01); *G06Q 30/0235* (2013.01)

(58) Field of Classification Search
  None
  See application file for complete search history.

(56) References Cited

U.S. PATENT DOCUMENTS

| | | | | |
|---|---|---|---|---|
| 6,230,143 B1* | 5/2001 | Simons | ................... | G06Q 30/02 705/14.39 |
| 7,013,286 B1* | 3/2006 | Aggarwal | .......... | G06Q 30/0225 705/14.26 |
| 8,489,452 B1* | 7/2013 | Warner | .............. | G06Q 30/0238 705/14.34 |
| 9,026,472 B2 | 5/2015 | Pappas et al. | | |
| 10,354,286 B1* | 7/2019 | Walker | ............... | G06Q 30/0269 |
| 10,636,050 B1* | 4/2020 | Bartow | .............. | G06Q 20/0457 |
| 10,706,462 B1* | 7/2020 | Walker | ............... | G06Q 30/0275 |
| 10,956,926 B1* | 3/2021 | Clem | ....................... | H04L 51/02 |
| 11,037,157 B1* | 6/2021 | Toewe | ............... | G06Q 20/3821 |
| 11,074,603 B1* | 7/2021 | Smith | ................ | G06Q 30/0212 |

(Continued)

*Primary Examiner* — Mathew Syrowik
(74) *Attorney, Agent, or Firm* — ALLEN, DYER, DOPPELT, + GILCHRIST, P.A.

(57) ABSTRACT

A digital promotion processing system may include a shopper device associated with a given shopper, and a promotion processing server. The promotion processing server may be configured to determine available digital promotions for a given product for purchase, each available digital promotion having different redemption terms. The promotion processing server may also be configured to cooperate with the shopper device to prompt the shopper to select one of the available digital promotions to apply toward purchase of the given product, store shopper promotion terms preference data based upon the selected digital promotion, and update the shopper promotion terms preference data based upon a plurality of new selections of available digital promotions. The promotion processing server may further be configured to generate and communicate a personalized digital promotion to the shopper device. The personalized digital promotion may have redemption terms based upon the updated shopper promotion terms preference data.

16 Claims, 6 Drawing Sheets

(56) References Cited

U.S. PATENT DOCUMENTS

| | | | |
|---|---|---|---|
| 11,087,349 B1* | 8/2021 | Bowman | G06Q 20/407 |
| 11,182,832 B2 | 11/2021 | Magadi et al. | |
| 2003/0154125 A1* | 8/2003 | Mittal | G06Q 30/0222 |
| | | | 705/14.23 |
| 2006/0015404 A1* | 1/2006 | Tran | G06Q 30/00 |
| | | | 705/14.25 |
| 2008/0270231 A1* | 10/2008 | Li | G06Q 30/0211 |
| | | | 705/1.1 |
| 2008/0300984 A1* | 12/2008 | Li | G06Q 30/0207 |
| | | | 705/14.1 |
| 2012/0150617 A1* | 6/2012 | Bennett | G06Q 30/0239 |
| | | | 705/14.35 |
| 2013/0117094 A1* | 5/2013 | Jones | G06Q 30/0222 |
| | | | 705/14.35 |
| 2014/0278878 A1* | 9/2014 | Wiegand | G06Q 30/0224 |
| | | | 705/14.25 |
| 2017/0011415 A1* | 1/2017 | Vaysman | G06Q 30/0224 |
| 2017/0046732 A1* | 2/2017 | Elmachtoub | G06N 20/00 |
| 2017/0068982 A1* | 3/2017 | Vangala | G06Q 30/0224 |
| 2018/0293628 A1* | 10/2018 | Magadi | G06Q 30/0277 |
| 2019/0295126 A1* | 9/2019 | Madden | G06N 20/00 |
| 2020/0027033 A1* | 1/2020 | Garg | G06F 17/18 |

* cited by examiner

DIGITAL PROMOTION PROCESSING SYSTEM INCLUDING PROMOTION TERMS PREFERENCE DATA BASED PROMOTION GENERATION AND RELATED METHODS

TECHNICAL FIELD

The present invention relates to the field of promotion processing, and, more particularly, to generating a digital promotion based upon promotional terms preference data and related methods.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period. Other promotional terms may include companion product and purchase quantity requirements.

SUMMARY

A digital promotion processing system may include a shopper device associated with a given shopper. The digital promotion processing system may also include a promotion processing server. The promotion processing server may be configured to determine a plurality of available digital promotions for a given product for purchase, each available digital promotion having different redemption terms. The promotion processing server may also be configured to cooperate with the shopper device to prompt the shopper to select one of the plurality of available digital promotions to apply toward purchase of the given product. The promotion processing server may further be configured to store shopper promotion terms preference data based upon the selected one of the plurality of digital promotions, and update the shopper promotion terms preference data based upon a plurality of new selections of available digital promotions. The promotion processing server may further be configured to generate and communicate a personalized digital promotion to the shopper device, the personalized digital promotion having redemption terms based upon the updated shopper promotion terms preference data.

Each selected digital promotion may be associated with a given retailer, for example. The promotion processing server may be configured to generate the personalized digital promotion to have redemption terms based upon the associated retailer.

The digital promotion processing system may further include a retailer server. The promotion processing server may be configured to cooperate with the retailer server to apply the selected digital promotion toward purchase of the given product for purchase, for example.

The promotion processing server may be configured to obtain historical purchase data for the given shopper and generate the personalized digital promotion to have redemption terms based upon the historical purchase data. The promotion processing server may be configured to apply machine learning to learn preferred redemption terms, and generate the digital promotion to have redemption terms based upon the learned preferred redemption terms, for example.

The promotion processing server may be configured to obtain historical purchase data for a plurality of other shoppers, and generate the personalized digital promotion to have redemption terms based upon the historical purchase data for the other shoppers, for example. The promotion processing server may be configured to obtain promotion terms preference data for the plurality of other shoppers and generate the personalized digital promotion to have redemption terms based upon the promotion terms preference data for the plurality of other shoppers. The redemption terms may include at least one of an expiration date, a redemption value, a companion product purchase, a purchase quantity, and deferability.

A method aspect is directed to a method of processing a digital promotion. The method may include using a promotion processing server to determine a plurality of available digital promotions for a given product for purchase, wherein each available digital promotion may have different redemption terms, and cooperate with a shopper device associated with a given shopper to prompt the shopper to select one of the plurality of available digital promotions to apply toward purchase of the given product. The method may also include using the promotion processing server to store shopper promotion terms preference data based upon the selected one of the plurality of digital promotions, and update the shopper promotion terms preference data based upon a plurality of new selections of available digital promotions. The method may further include using the promotion processing server to generate and communicate a personalized digital promotion to the shopper device, the personalized digital promotion having redemption terms based upon the updated shopper promotion terms preference data.

A computer readable medium aspect is directed to a non-transitory computer readable medium for processing a digital promotion. The non-transitory computer readable medium includes computer executable instructions that when executed by a processor of a promotion processing server cause the processor to perform operations. The operations may include determining a plurality of available digital promotions for a given product for purchase, each available digital promotion having different redemption terms. The operations may also include cooperating with a shopper device associated with a given shopper to prompt the shopper to select one of the plurality of available digital promotions to apply toward purchase of the given product. The operations may further include storing shopper promotion terms preference data based upon the selected one of the plurality of digital promotions, and updating the shopper promotion terms preference data based upon a plurality of new selections of available digital promotions. The operations may also include generating and communicating a personalized digital promotion to the shopper device, the personalized digital promotion having redemption terms based upon the updated shopper promotion terms preference data.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
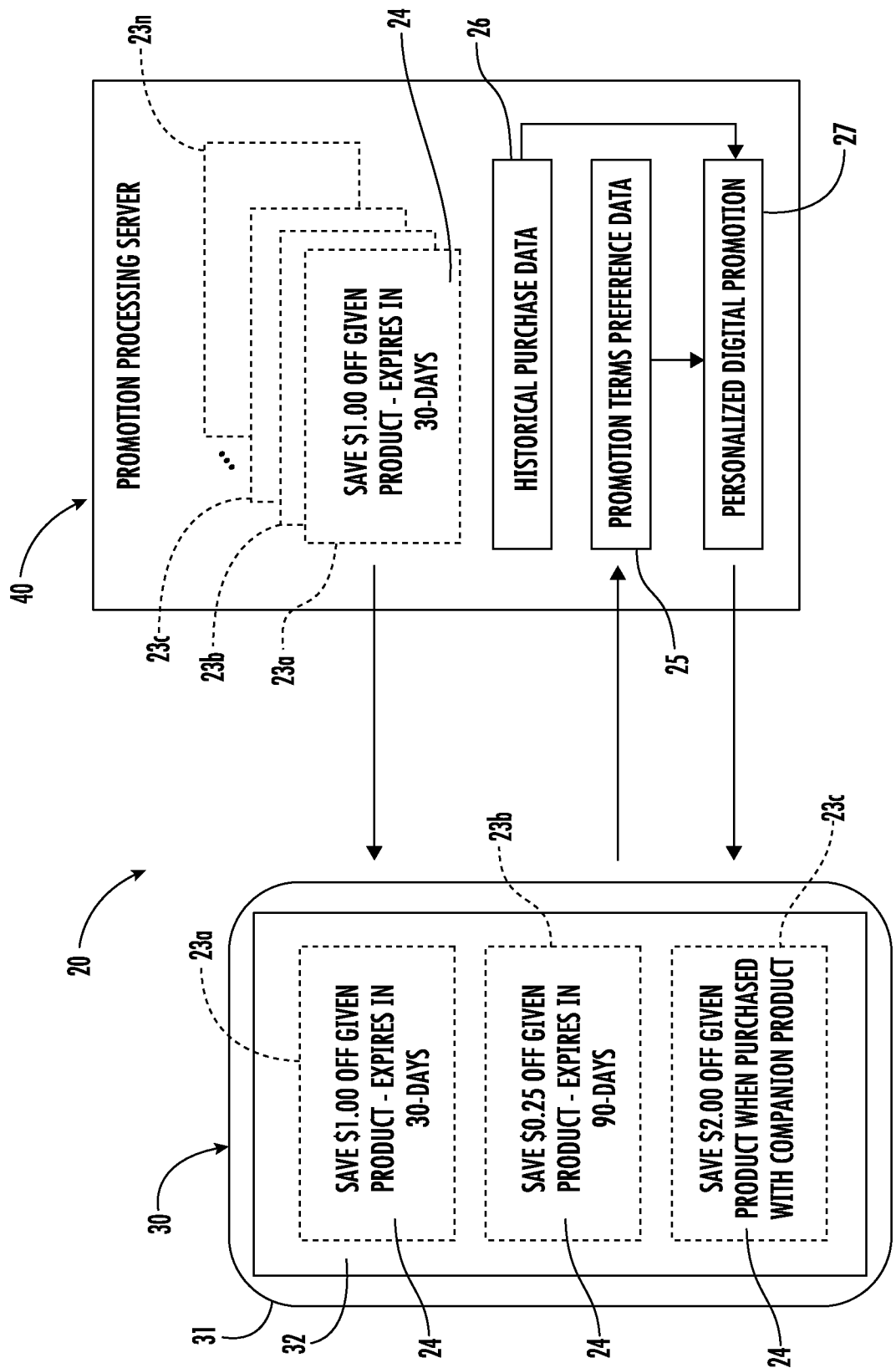
FIG. 1 is a schematic diagram of a digital promotion processing system in accordance with an embodiment.
Figure 2:
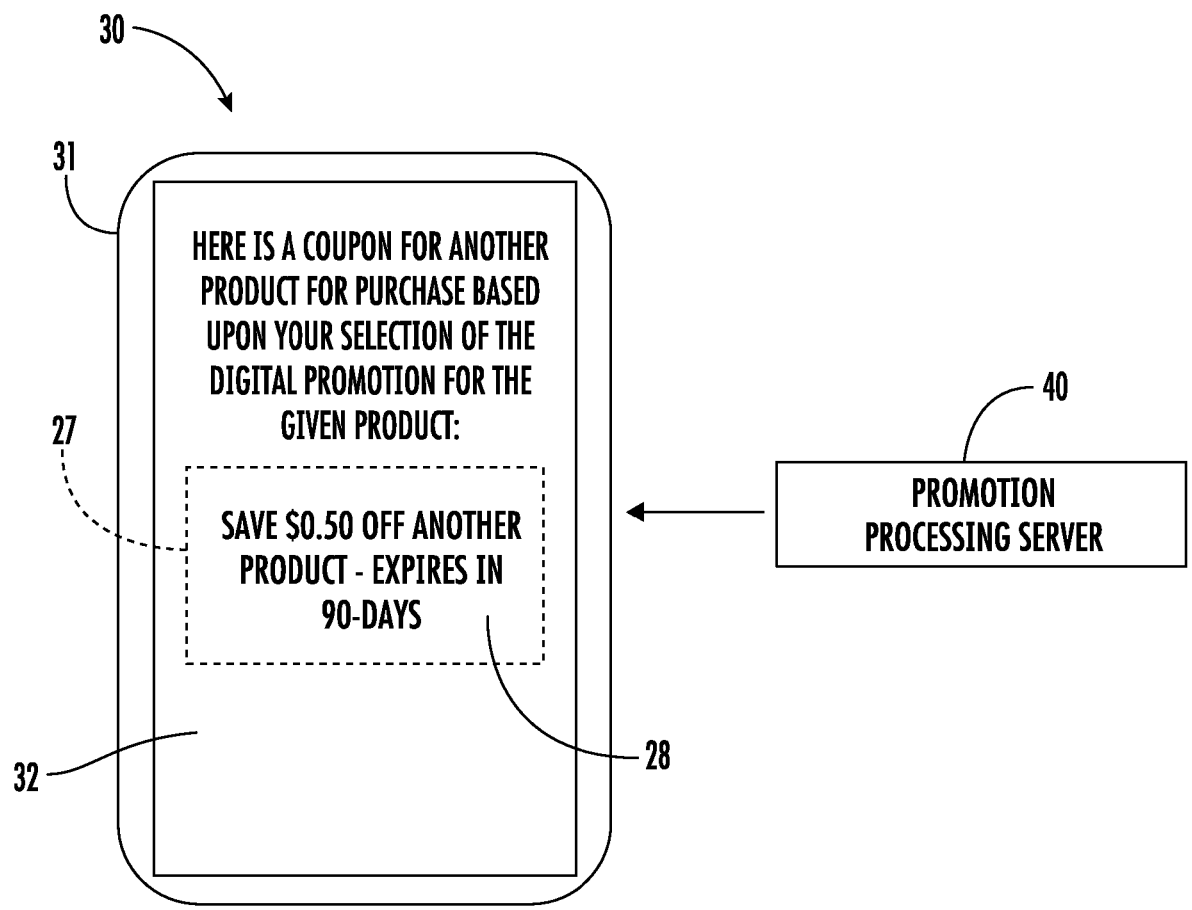
FIG. 2 is another schematic diagram of a portion of the digital promotion processing system of FIG. 1.
Figure 3:
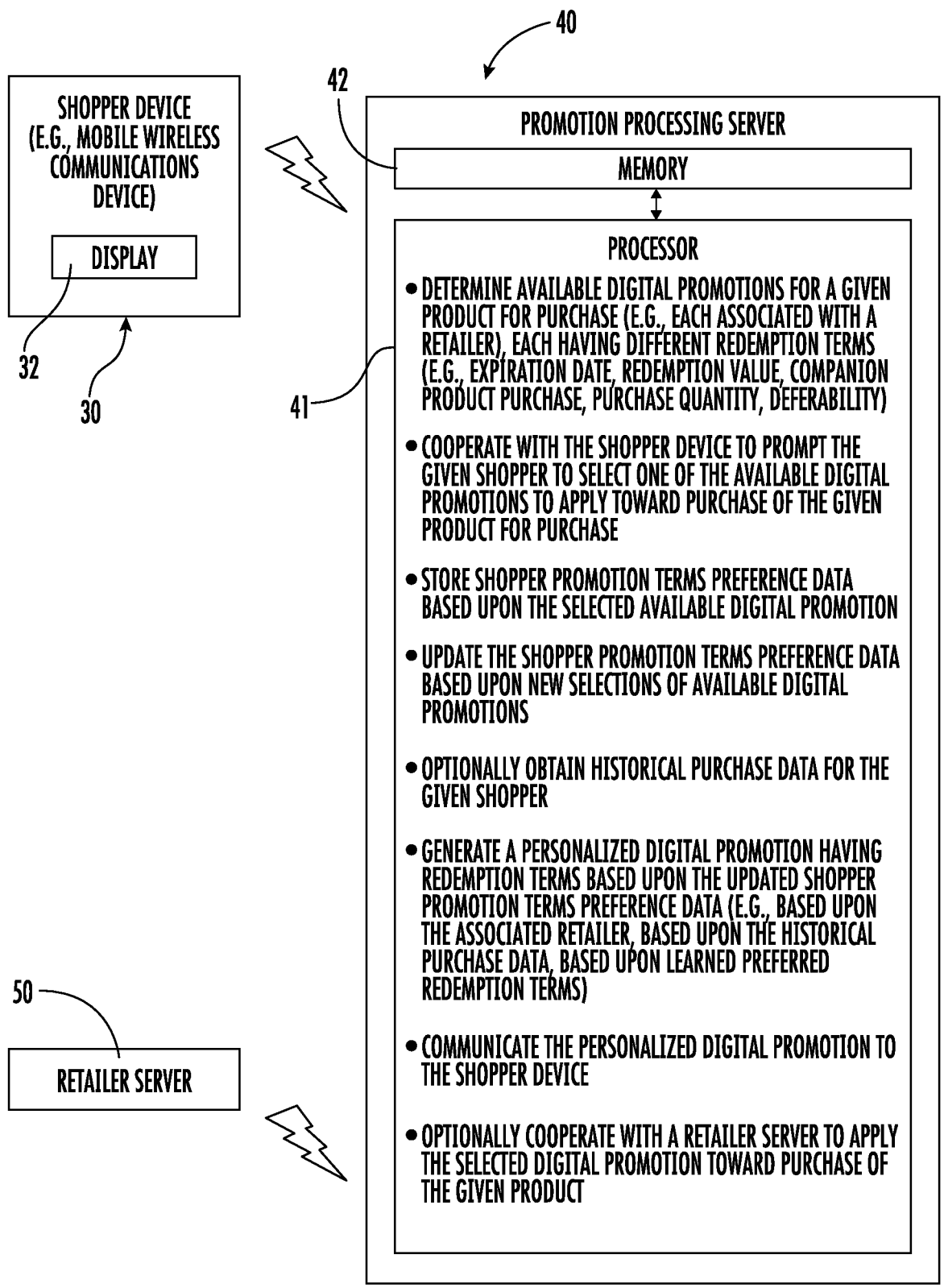
FIG. 3 is a schematic block diagram of the digital promotion processing system of FIG. 1.

Referring initially to FIGS. 1-3, a digital promotion processing system 20 includes a shopper device 30 associated with a given shopper. The shopper device 30 is illustratively in the form of a mobile wireless communications device, and more particularly, a smartphone. Of course, the shopper device 30 may be another type of device, for example a laptop computer, tablet computer, personal computer, or wearable device. The shopper device 30 includes a housing 31 and display 32 carried by the housing. The display 32 may be in the form of a touch display defining also an input device. Of course, the shopper device 30 may include an input device in addition to the display 32, whether in the form of a touch display or not.

A promotion processing server 40 includes a processor 41 and an associated memory 42. While operations of the promotion processing server 40 are described herein, it should be appreciated that the operations are performed by way of cooperation between the processor 41 and the memory 42.

Figure 4:
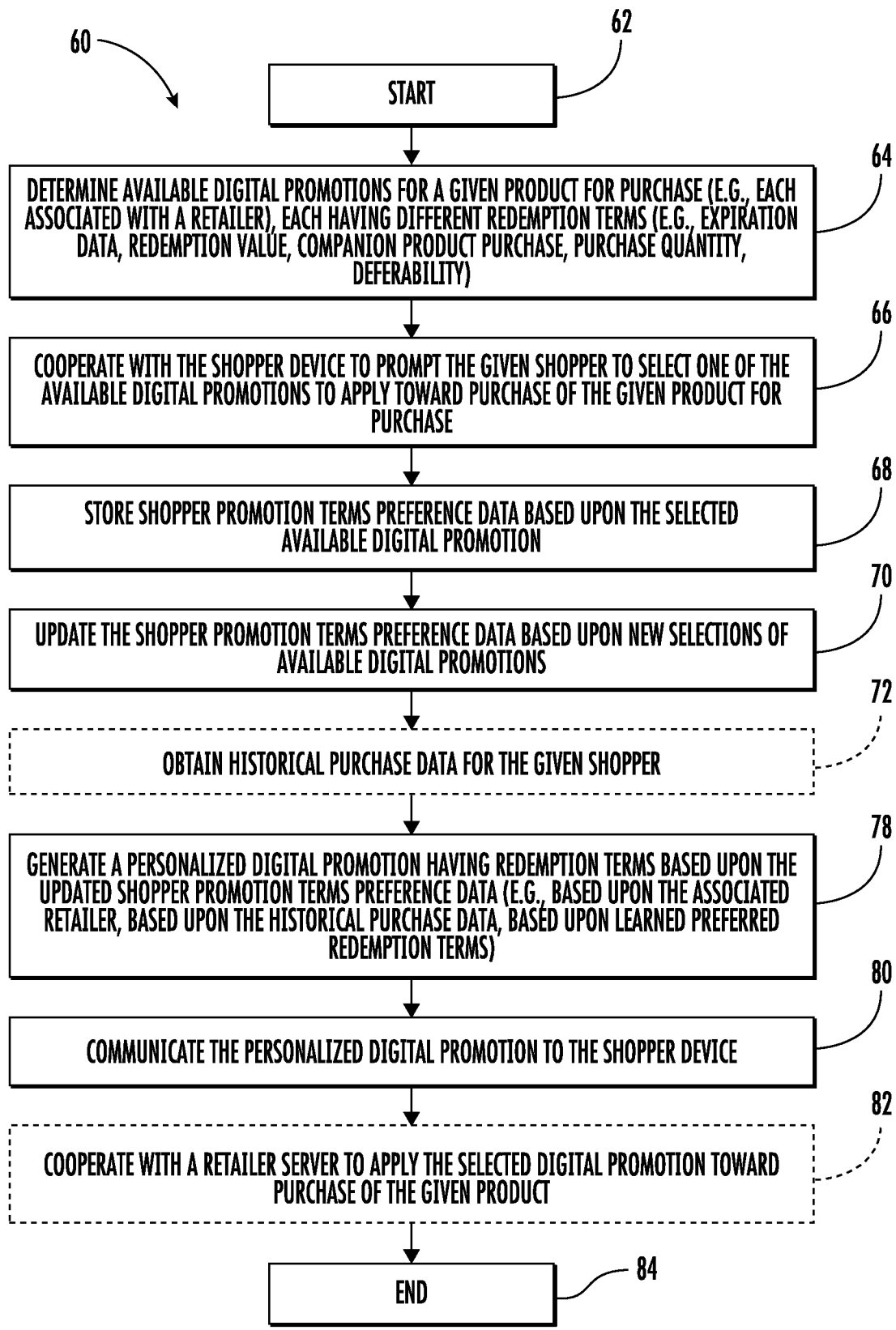
FIG. 4 is a flow chart illustrating operation of the promotion processing server of FIG. 1.

Referring additionally to the flowchart 60 in FIG. 4, beginning at Block 62, operations of the promotion processing server 40 will now be described. At Block 64, the promotion processing server 40 determines available digital promotions 23a-23n for a given product for purchase. The digital promotions 23a-23n are in the form of digital coupons, redeemable toward the product for purchase. Each available digital promotion 23a-23n has different redemption terms 24. The redemption terms 24 may include an expiration date, a redemption value, a companion product purchase, a purchase quantity, and deferability. For example, one digital promotion 23a may be for $1.00 off the given product for purchase and have an expiration in 30-days, while another digital promotion 23b may be for $0.25 off the given product for purchase and have an expiration in 90-days, while yet another digital promotion 23c may be for $2.00 off the given product for purchase when purchased with a companion product. The promotion processing server 40 may determine the available digital promotions 23a-23n by accessing a database, for example, stored in the memory 42 of available digital promotions for any given product for purchase and based upon a promotional campaign from a manufacturer or retailer.

The promotion processing server 40 is configured to, at Block 66, cooperate with the shopper device 30 to prompt the given shopper to select one 23b of the available digital promotions 23a-23n to apply toward purchase of the given product for purchase. For example, the shopper device 30 may display, on the display 32, a listing of the available digital promotions 23a-23n for the given product for purchase for selection by the given shopper. The shopper device 30 may permit the given shopper to rank available digital promotions, for example, by desirability or likelihood of redemption. The ranking may also permit differentiation between in-store and e-commerce offers or promotions.

The promotion processing server 40 stores, for example, in the memory 42, shopper promotion terms preference data 25 based upon the selected digital promotion 23b (Block 68). More particularly, the promotion processing server 40 stores the redemption terms associated with the selected digital promotion 23b along with an identification of the given product for purchase (e.g., a stock keeping unit (SKU), uniform product code (UPC), or other identifier) and an identification (ID) of the given shopper. The given shopper identification may be a name, username, email address, phone number, or other identifier. In an embodiment, for example, wherein the available digital promotions 23a-23n are associated with a retailer, the given shopper ID may be a loyalty account identifier or loyalty account number. The promotion processing server 40, at Block 70, updates the shopper promotion terms preference data 25 based upon new selections of available digital promotions.

At Block 72, the promotion processing server 40 may optionally obtain historical purchase data 26 for the given shopper. Historical purchase data 26 may include past purchases, for example, by item, for the given shopper, price paid, date and time of purchase, quantity purchased, whether a coupon or promotion was redeemed. The historical purchase data 26 may be updated on a per-purchase or per-item basis.

The promotion processing server 40 generates a personalized digital promotion 27 (Block 78). The personalized digital promotion 27 has redemption terms 28 based upon the updated shopper promotion terms preference data 25. More particularly, the promotion processing server 40 may apply machine learning to learn preferred redemption terms. For example, the promotion processing server 40 may operate a machine learning algorithm that accepts as input, e.g., over time, the shopper digital promotion selections, the historical purchase data 26, and the associated promotional terms, as updated, so that for any given product for purchase, the machine learning algorithm may output the personalized digital promotion 27 to have redemption terms that are preferred for the given shopper or based upon the learned preferred redemption terms and the historical purchase data. As will be appreciated by those skilled in the art, since the historical purchase data 26 is updated relatively frequently, the machine learning algorithm may generate a different personalized digital promotion 27 at different times for the same shopper. Other and/or additional inputs may be provided to the machine learning algorithm, for example, any ranking of the available digital promotions 23a-23n and/or based upon in-store or e-commerce.

When each digital promotion 23a-23n is associated with a given retailer, the promotion processing server 40 may also generate the personalized digital promotion 27 to have redemption terms based upon the associated retailer. In other words, the promotion processing server 40 may consider store-specific profile data that reflects the preferences of the given shopper.

In a given implementation example, if the given shopper typically prefers lower redemption values and longer expiration dates for fresh foods, when multiple available digital promotions are available for a fresh food item, the promotion processing server will generate the personalized digital promotion to have the lower redeemable value and longer expiration (i.e., so the given shopper only sees the digital promotion having the lower redemption value and longer expiration).

The promotion processing server 40 communicates, for example, wirelessly, the personalized digital promotion 27 to the shopper device 30 (Block 80). For example, the personalized digital promotion 27 may be displayed on the display 32 of the shopper device 30 for redemption at a point-of-sale (POS) terminal by scanning thereat. At Block 82, the promotion processing server 40 may cooperate with a retailer server 50 to apply the selected digital promotion 23b toward the purchase of the given product for purchase. For example, the retailer server 50 may be coupled to a POS terminal and apply the selected digital promotion 23b upon scanning at the POS terminal. In an e-commerce platform, for example, the promotion processing server 40 may apply the selected digital promotion 23b to the product for purchase based upon checkout, for example, from a virtual shopping cart. The promotion processing server 40 may alternatively or additionally cooperate with the shopper device 30 to apply the personalized digital promotion 27 toward purchase of a given product. Operations end at Block 84.

Figure 5:
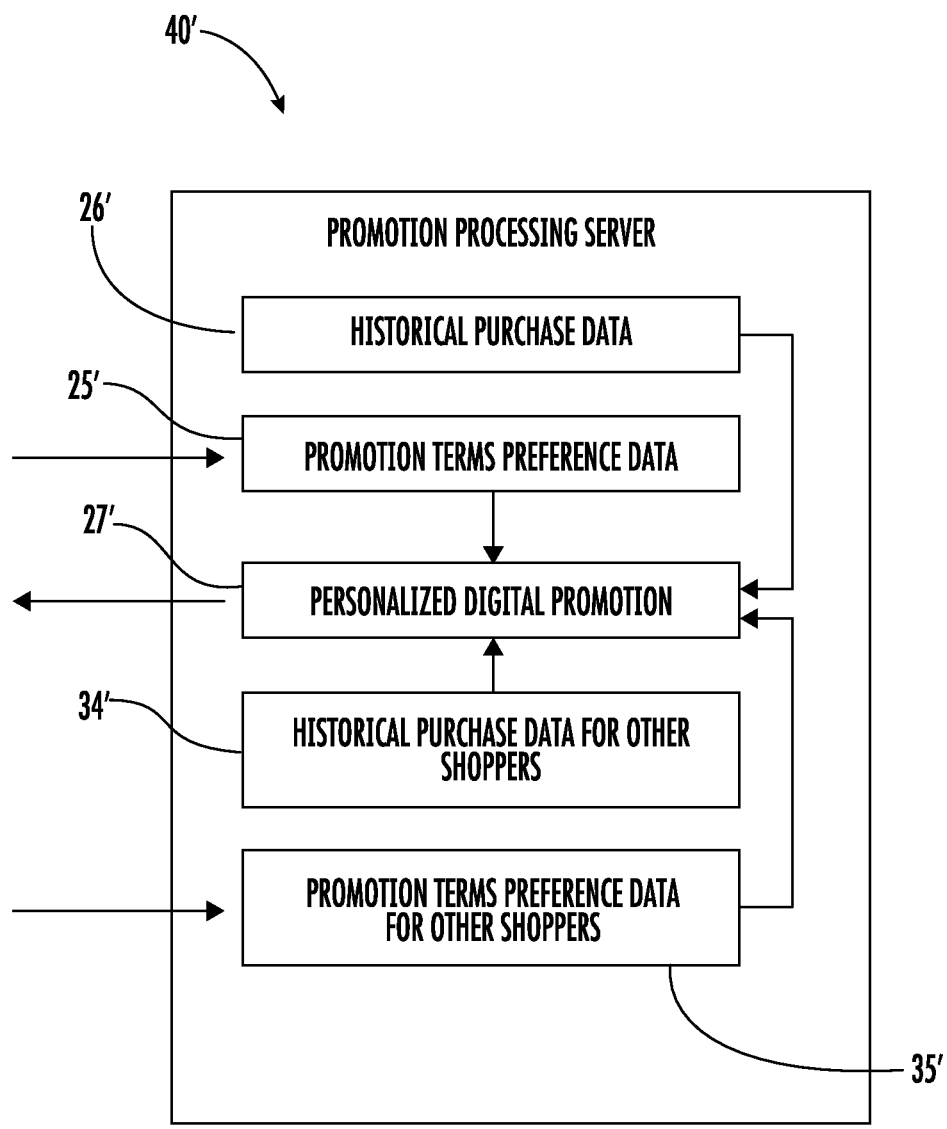
FIG. 5 is a schematic diagram of a portion of a digital promotion processing system in accordance with another embodiment.
Figure 6:
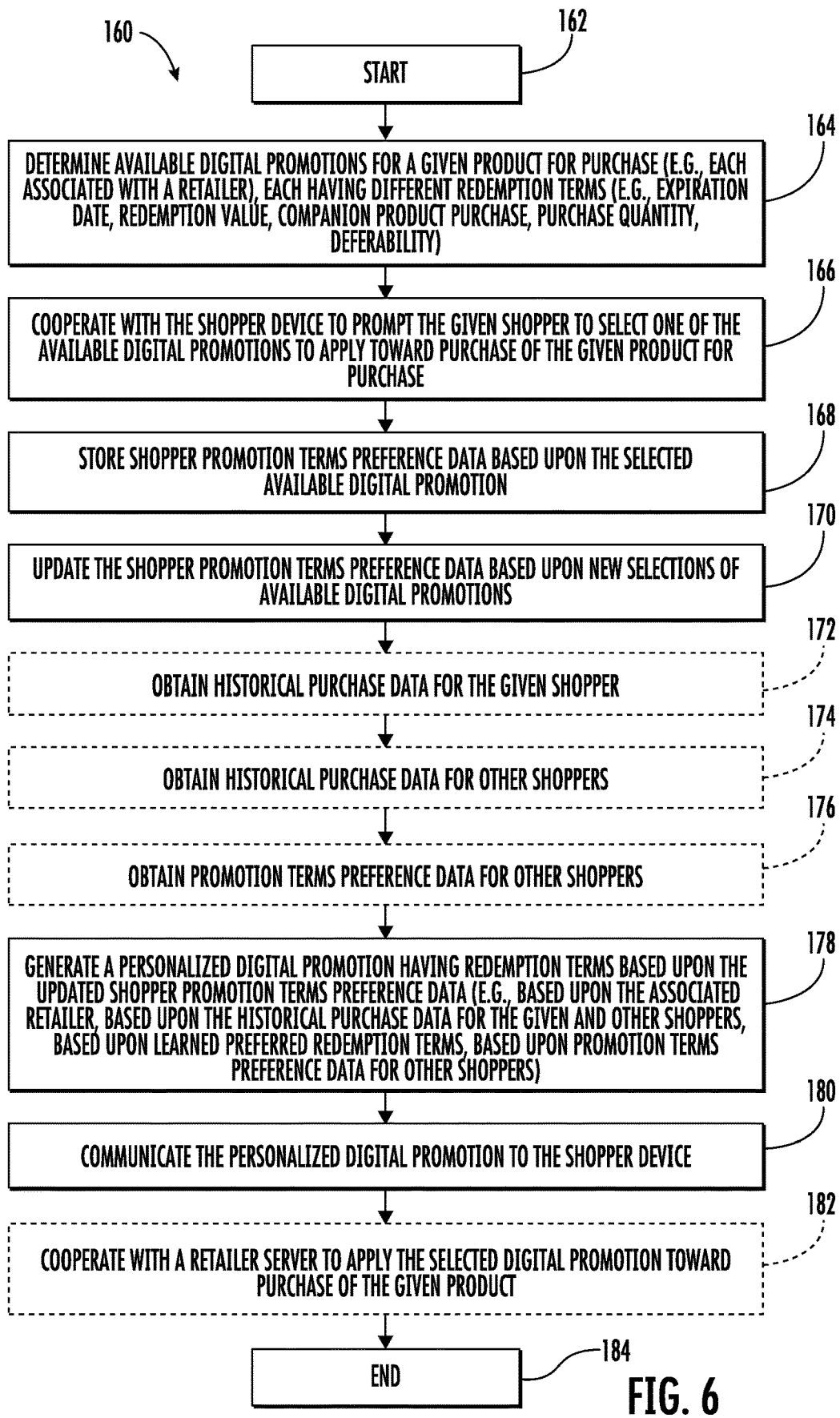
FIG. 6 is a flow chart illustrating operation of the promotion processing server of FIG. 5.

Referring now to FIG. 5 and the flowchart 160 in FIG. 6, beginning at Block 162, operations of the promotion processing server 40' in accordance with another embodiment are described. Operations 164-172 and 178-182 are similar to the operations at Blocks 64-72 and 78-82, described above with respect to the flowchart in FIG. 4. At Block 174, the promotion processing server 40' obtains historical purchase data for other shoppers 34'. The historical purchase data for the other shoppers 34' may include the same types of historical data as the historical data for the given shopper 26' and described above, for example. At Block 176, the promotion processing server 40' may also obtain promotion terms preference data for the other shoppers 35' similarly to the promotion terms preference data for the given shopper 25'. Accordingly, at Block 178, the promotion processing server 40' may thus generate the personalized digital promotion 27' to have redemption terms that are based upon the promotion terms preference data for the other shoppers 35' and the historical purchase data for the other shoppers 34'. Where the promotion processing server 40' applies machine learning, the historical purchase data for the other shoppers 34' and the promotion terms preference data for the other shoppers 35' may be supplied as inputs to the machine learning algorithm and updated as the other shopper make purchases and/or select digital promotions, as described above. The other shoppers may or may not obtain or receive a personalized digital promotion, as described above. In other words, the other shoppers may or may not be active participants in the system described herein. Operations end at Block 184.

As will be appreciated by those skilled in the art, consumer retail savings vehicles (e.g., digital promotions or coupons) are often not allowed to stack, in which cases only one savings vehicle can be applied to a given item purchase. Arbitration in a POS and/or cloud-based (e.g., e-commerce) system generally apply logic to determine which savings are applicable in such cases, this is generally configured at the retailer level. However, different shoppers, in different situations, may make other choices. Accordingly, the present system 20 personalizes the arbitration rules, to afford the shopper more choice in determining their savings, and thus make a retailer offering personalized arbitration.

A method aspect is directed to a method of processing a digital promotion. The method includes using a promotion processing server 40 to determine a plurality of available digital promotions 23a-23n for a given product for purchase, wherein each available digital promotion has different redemption terms 24, and cooperate with a shopper device 30 associated with a given shopper to prompt the shopper to select one of the plurality of available digital promotions to apply toward purchase of the given product. The method also includes using the promotion processing server 40 to store shopper promotion terms preference data 25 based upon the selected one of the plurality of digital promotions 23b, and update the shopper promotion terms preference data based upon a plurality of new selections of available digital promotions. The method further includes using the promotion processing server 40 to generate and communicate a personalized digital promotion 27 to the shopper device 30, the personalized digital promotion having redemption terms 28 based upon the updated shopper promotion terms preference data.

A computer readable medium aspect is directed to a non-transitory computer readable medium for processing a digital promotion. The non-transitory computer readable medium includes computer executable instructions that when executed by a processor 41 of a promotion processing server 40 cause the processor to perform operations. The operations include determining a plurality of available digital promotions 23a-23n for a given product for purchase, each available digital promotion having different redemption terms 24. The operations also include cooperating with a shopper device 30 associated with a given shopper to prompt the shopper to select one of the plurality of available digital promotions 23a-23n to apply toward purchase of the given product. The operations further include storing shopper promotion terms preference data 25 based upon the selected one of the plurality of digital promotions 23b, and updating the shopper promotion terms preference data based upon a plurality of new selections of available digital promotions. The operations also include generating and communicating a personalized digital promotion 27 to the shopper device 30, the personalized digital promotion having redemption terms 28 based upon the updated shopper promotion terms preference data.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:
a shopper device associated with a given shopper; and a promotion processing server including a hardware processor and memory storing instructions executable by the processor to:
  obtain historical purchase data of the given shopper, the historical purchase data being updated on a per-purchase basis;
  obtain historical purchase data of a plurality of other shoppers not including the given shopper;
  determine a plurality of available digital promotions promoting a same given product for purchase, the same given product for purchase being associated with a same unique product identifier identifying the given product for purchase, each of the plurality of available digital promotions having different redemption terms comprising (1) a promotion expiration date, (2) a redemption value being, among all of the plurality of available digital promotions, inversely proportional to expiration duration as defined by the promotion expiration date, and (3) a companion product purchase condition for redemption of the same given product, each of the plurality of available digital promotions being redeemable toward the same given product for purchase identified by the same unique product identifier, and the plurality of available digital promotions being determined so that among the plurality of digital promotions, the redemption value of each of the digital promotions varies correspondingly with the companion product purchase condition for redemption;
  communicate the digital promotions and the redemption terms of the digital promotions to the shopper device to permit ranking of the digital promotions by the given shopper and prompt the shopper to select one of the plurality of available digital promotions to apply toward purchase of the given product at a given retailer;
  store shopper promotion terms preference data based upon the selected one of the plurality of digital promotions, the shopper promotion terms preference data including (1) preferred expiration date data of the given shopper, (2) preferred redemption value data of the given shopper, and (3) companion product purchase condition data of the given shopper;
  obtain promotion terms preference data of the plurality of other shoppers, the promotion terms preference data of the plurality of other shoppers including (1) preferred expiration date data of the other shoppers, (2) preferred redemption value data of the other shoppers, and (3) companion product purchase condition data of the other shoppers;
  operate a machine learning algorithm and learn, using the machine learning algorithm, preferred redemption terms of the given shopper, the learned preferred redemption terms including (1) a preferred expiration date of the given shopper, (2) a preferred redemption value of the given shopper, and (3) a companion product purchase condition of the given shopper, the machine learning algorithm accepting, as input, (1) the historical purchase data of both the given shopper and the plurality of other shoppers, (2) the shopper promotion terms preference data, and (3) the obtained promotion terms preference data of the plurality of other shoppers to obtain the learned preferred redemption terms;
  update the shopper promotion terms preference data of the given shopper based upon a plurality of new selections by the given shopper of available digital promotions;
  update the machine learning algorithm by accepting, as input, (1) the updated shopper promotion terms preference data, (2) updated historical purchase data of both the given shopper and the plurality of other shoppers, and (3) updated promotion terms preference data of the plurality of other shoppers;
  operate the updated machine learning algorithm and update, using the updated machine learning algorithm, each of the learned preferred redemption terms;
  generate, using the updated machine learning algorithm, a personalized digital promotion having the updated learned preferred redemption terms; and
  communicate the personalized digital promotion to the shopper device for display at the shopper device.

2. The digital promotion processing system of claim 1 wherein the promotion processing server is configured to generate the personalized digital promotion to have redemption terms based upon the retailer.

3. The digital promotion processing system of claim 1 further comprising a retailer server; and wherein the promotion processing server is configured to cooperate with the retailer server to apply the personalized digital promotion toward purchase of the given product for purchase.

4. A digital promotion processing server comprising:
  a hardware processor and an associated memory storing instructions executable by the processor to:
    obtain historical purchase data of a given shopper, the historical purchase data being updated on a per-purchase basis;
    obtain historical purchase data of a plurality of other shoppers not including the given shopper;
    determine a plurality of available digital promotions promoting a same given product for purchase, the same given product for purchase being associated with a same unique product identifier identifying the given product for purchase, each of the plurality of available digital promotions having different redemption terms comprising (1) a promotion expiration date, (2) a redemption value being, among all of the plurality of available digital promotions, inversely proportional to expiration duration as defined by the promotion expiration date, and (3) a companion product purchase condition for redemption of the same given product, each of the plurality of available digital promotions being redeemable toward the same given product for purchase identified by the same unique product identifier, and the plurality of available digital promotions being determined so that among the plurality of digital promotions, the redemption value of each of the digital promotions varies correspondingly with the companion product purchase condition for redemption;
    communicate the digital promotions and the redemption terms of the digital promotions to a shopper device associated with the given shopper to permit ranking of the digital promotions by the given shopper and to prompt the shopper to select one of the plurality of available digital promotions to apply toward purchase of the given product at a given retailer;
    store shopper promotion terms preference data based upon the selected one of the plurality of digital promotions, the shopper promotion terms preference data including (1) preferred expiration date data of the given shopper, (2) preferred redemption value data of the given shopper, and (3) companion product purchase condition data of the given shopper;

obtain promotion terms preference data of the plurality of other shoppers, the promotion terms preference data of the plurality of other shoppers including (1) preferred expiration date data of the other shoppers, (2) preferred redemption value data of the other shoppers, and (3) companion product purchase condition data of the other shoppers;

operate a machine learning algorithm and learn, using the machine learning algorithm, preferred redemption terms of the given shopper, the learned preferred redemption terms including (1) a preferred expiration date of the given shopper, (2) a preferred redemption value of the given shopper, and (3) a companion product purchase condition of the given shopper, the machine learning algorithm accepting, as input, (1) the historical purchase data of both the given shopper and the plurality of other shoppers, (2) the shopper promotion terms preference data, and (3) the obtained promotion terms preference data of the plurality of other shoppers to obtain the learned preferred redemption terms;

update the shopper promotion terms preference data of the given shopper based upon a plurality of new selections by the given shopper of available digital promotions;

update the machine learning algorithm by accepting, as input (1) the updated shopper promotion terms preference data, (2) updated historical purchase data of both the given shopper and the plurality of other shoppers, and (3) updated promotion terms preference data of the plurality of other shoppers;

operate the updated machine learning algorithm and update, using the updated machine learning algorithm, each of the learned preferred redemption terms;

generate, using the updated machine learning algorithm, a personalized digital promotion having the updated learned preferred redemption terms; and communicate the personalized digital promotion to the shopper device for display at the shopper device.

5. The digital promotion processing server of claim 4 wherein the processor is configured to generate the personalized digital promotion to have redemption terms based upon the retailer.

6. The digital promotion processing server of claim 4 wherein the processor is configured to cooperate with a retailer server to apply the selected personalized digital promotion toward purchase of the given product for purchase.

7. A method of processing a digital promotion, the method comprising:

using, by a shopper device associated with a given shopper, a promotion processing server having a hardware processor and a non-transitory computer-readable medium storing instructions being executed by the processor to:

obtain historical purchase data of the given shopper, the historical purchase data being updated on a per-purchase basis;

obtain historical purchase data of a plurality of other shoppers not including the given shopper;

determine a plurality of available digital promotions promoting a same given product for purchase, the same given product for purchase being associated with a same unique product identifier identifying the given product for purchase, each of the plurality of available digital promotions having different redemption terms comprising (1) a promotion expiration date, (2) a redemption value being, among all of the plurality of available digital promotions, inversely proportional to expiration duration as defined by the promotion expiration date, and (3) a companion product purchase condition for redemption of the same given product, and each of the plurality of available digital promotions being redeemable toward the same given product for purchase identified by the same unique product identifier, and the plurality of available digital promotions being determined so that among the plurality of digital promotions, the redemption value of each of the digital promotions varies correspondingly with the companion product purchase condition for redemption;

communicate the digital promotions and the redemption terms of the digital promotions to the shopper device to permit ranking of the digital promotions by the given shopper and prompt the shopper to select one of the plurality of available digital promotions to apply toward purchase of the given product at a given retailer;

store shopper promotion terms preference data based upon the selected one of the plurality of digital promotions, the shopper promotion terms preference data including (1) preferred expiration date data of the given shopper, (2) preferred redemption value data of the given shopper, and (3) companion product purchase condition data of the given shopper;

obtain promotion terms preference data of the plurality of other shoppers, the promotion terms preference data of the plurality of other shoppers including (1) preferred expiration date data of the other shoppers, (2) preferred redemption value data of the other shoppers, and (3) companion product purchase condition data of the other shoppers;

operate a machine learning algorithm and learn, using the machine learning algorithm, preferred redemption terms of the given shopper, the learned preferred redemption terms including (1) a preferred expiration date of the given shopper, (2) a preferred redemption value of the given shopper, and (3) a companion product purchase condition of the given shopper, the machine learning algorithm accepting, as input, (1) the historical purchase data of both the given shopper and the plurality of other shoppers, (2) the shopper promotion terms preference data, and (3) the obtained promotion terms preference data of the plurality of other shoppers to obtain the learned preferred redemption terms;

update the shopper promotion terms preference data of the given shopper based upon a plurality of new selections by the given shopper of available digital promotions;

update the machine learning algorithm by accepting, as input, (1) the updated shopper promotion terms preference data, (2) updated historical purchase data of both the given shopper and the plurality of other shoppers, and (3) updated promotion terms preference data of the plurality of other shoppers;

operate the updated machine learning algorithm and update, using the updated machine learning algorithm, each of the learned preferred redemption terms;

generate, using the updated machine learning algorithm, a personalized digital promotion having the updated learned preferred redemption terms; and communicate the personalized digital promotion to the shopper device for display at the shopper device.

8. The method of claim 7 wherein using the promotion processing server comprises using the promotion processing server to generate the personalized digital promotion to have redemption terms based upon the retailer.

9. The method of claim 7 wherein using the promotion processing server comprises using the promotion processing server to cooperate with a retailer server to apply the personalized digital promotion toward purchase of the given product for purchase.

10. A non-transitory computer readable medium comprising computer executable instructions that when executed by a processor of a promotion processing server cause the processor to perform operations comprising:

obtaining historical purchase data of a given shopper, the historical purchase data being updated on a per-purchase basis;

obtaining historical purchase data of a plurality of other shoppers not including the given shopper;

determining a plurality of available digital promotions promoting a same given product for purchase, the same given product for purchase being associated with a same unique product identifier identifying the given product for purchase, each of the plurality of available digital promotions having different redemption terms comprising (1) a promotion expiration date, (2) a redemption value being, among all of the plurality of available digital promotions, inversely proportional to expiration duration as defined by the promotion expiration date, and (3) a companion product purchase condition for redemption of the same given product, each of the plurality of available digital promotions being redeemable toward the same given product for purchase identified by the same unique product identifier, and the plurality of available digital promotions being determined so that among the plurality of digital promotions, the redemption value of each of the digital promotions varies correspondingly with the companion product purchase condition for redemption;

communicating the digital promotions and the redemption terms of the digital promotions to a shopper device associated with the given shopper to permit ranking of the digital promotions by the given shopper and prompting the shopper to select one of the plurality of available digital promotions to apply toward purchase of the given product at a given retailer;

storing shopper promotion terms preference data based upon the selected one of the plurality of digital promotions, the shopper promotion terms preference data including (1) preferred expiration date data of the given shopper, (2) preferred redemption value data of the given shopper, and (3) companion product purchase condition data of the given shopper;

obtaining promotion terms preference data of the plurality of other shoppers, the promotion terms preference data of the plurality of other shoppers including (1) preferred expiration date data of the other shoppers, (2) preferred redemption value data of the other shoppers, and (3) companion product purchase condition data of the other shoppers;

operating a machine learning algorithm and learning, using the machine learning algorithm, preferred redemption terms of the given shopper, the learned preferred redemption terms including (1) a preferred expiration date of the given shopper, (2) a preferred redemption value of the given shopper, and (3) a companion product purchase condition of the given shopper, the machine learning algorithm accepting, as input, (1) the historical purchase data of both the given shopper and the plurality of other shoppers, (2) the shopper promotion terms preference data, and (3) the obtained promotion terms preference data of the plurality of other shoppers to obtain the learned preferred redemption terms;

updating the shopper promotion terms preference data of the given shopper based upon a plurality of new selections by the given shopper of available digital promotions;

updating the machine learning algorithm by accepting, as input, (1) the updated shopper promotion terms preference data, (2) updated historical purchase data of both the given shopper and the plurality of other shoppers, and (3) updated promotion terms preference data of the plurality of other shoppers;

operating the updated machine learning algorithm and updating, using the updated machine learning algorithm, each of the learned preferred redemption terms;

generating, using the updated machine learning algorithm, a personalized digital promotion having the updated learned preferred redemption terms; and communicating the personalized digital promotion to the shopper device for display at the shopper device.

11. The non-transitory computer readable medium of claim 10 wherein the personalized digital promotion is generated to have redemption terms based upon the retailer.

12. The non-transitory computer readable medium of claim 10 wherein the promotion processing server communicates with a retailer server to apply the personalized digital promotion toward purchase of the given product for purchase.

13. The digital promotion processing system of claim 1 wherein the promotion processing server is configured to cooperate with the shopper device to display the plurality of available digital promotions thereat and permit the shopper to rank the plurality of digital promotions based upon a likelihood of redemption.

14. The digital promotion processing server of claim 4 wherein the processor is configured to cooperate with the shopper device to display the plurality of available digital promotions thereat and permit the shopper to rank the plurality of digital promotions based upon a likelihood of redemption.

15. The method of claim 7 wherein the digital promotion processing server cooperates with the shopper device to display the plurality of available digital promotions thereat and to permit the shopper to rank the plurality of digital promotions based upon a likelihood of redemption.

16. The non-transitory computer readable medium of claim 10 wherein the digital promotion processing server cooperates with the shopper device to display the plurality of available digital promotions thereat and to permit the shopper to rank the plurality of digital promotions based upon a likelihood of redemption.

* * * * *